United States Patent [19]

Housman et al.

[11] 4,368,648
[45] Jan. 18, 1983

[54] HAND BRAKE FOR RAILROAD CAR

[75] Inventors: Richard J. Housman, Dolton; Wajih Kanjo, Midlothian, both of Ill.

[73] Assignee: American Standard Inc., Chicago, Ill.

[21] Appl. No.: 162,298

[22] Filed: Jun. 23, 1980

[51] Int. Cl.³ .............................................. G05G 1/08
[52] U.S. Cl. .................................... 74/505; 254/169; 192/15; 192/94; 192/95
[58] Field of Search .............. 192/15, 16, 17 R, 12 R, 192/8 R, 95, 94, 8 A; 254/167, 169; 474/155, 164; 74/505

[56] References Cited

U.S. PATENT DOCUMENTS

| | | | |
|---|---|---|---|
| 2,462,167 | 2/1949 | Dath | 74/505 X |
| 2,462,183 | 2/1949 | Haseltine | 74/505 X |
| 3,040,597 | 6/1962 | Bretz | 192/15 X |
| 3,176,539 | 4/1965 | Mersereau | 192/15 |
| 3,602,063 | 8/1971 | Koehler | 74/505 |

Primary Examiner—George H. Krizmanich

Attorney, Agent, or Firm—R. S. Visk

[57] ABSTRACT

A hand brake including a lock-up and release clutch mechanism, a ratchet rotatable by a hand wheel connected thereto through a drive shaft, a nut screw-threadedly arranged on the shaft and effective, upon rotation of the wheel and shaft in one direction, for advancing on the nut on the shaft to cause the ratchet to be clamped between respective friction surfaces of the nut and friction plates carried on the shaft. Rotation of the shaft causes rotation of a pinion which, in turn, rotates a gear associated with a chain drum to effect chain take-up and, therefore, application of the brakes. A holding pawl prevents rotation of the ratchet in a release direction. Rotation of the hand wheel in an opposite direction effects release of the clutch mechanism and consequently relaxation of tension on the chain for effecting a gradual release of the brakes. Quick release of the brakes is effected by a lever which, by rotation, causes disengagement of the collar from the pinion.

6 Claims, 10 Drawing Figures

HAND BRAKE FOR RAILROAD CAR

BACKGROUND OF THE INVENTION

In some of the presently known hand brakes, clutch means are employed for assisting in gradual release of chain tension for gradual release of the brakes from the applied position. The clutch mechanism is operated to an engaged disposition during the chain take-up or brake-applying operation so as to be conditioned for subsequent gradual brake release. In some instances, the clutch assembly includes an annular member which must be moved axially into frictional engagement with another member for effecting engagement of the clutch, and in some of these instances, the annular member is moved axially by another member which makes only single point contact therewith. This presents the possibility of causing the annular member to pivot about its own axis and consequent binding thereof. In other instances, a spring may be used for urging the annular member into frictional contact with the other clutch member. This is not considered desirable because the spring may break and cause damage and malfunction of the clutch mechanism.

SUMMARY OF THE INVENTION

The principal object of the invention, therefore, is to provide a hand brake including a clutch mechanism for facilitating gradual release of the brake, said clutch mechanism being dependable in operation.

Briefly, the invention resides primarily in the arrangement of the clutch mechanism relative to the take-up and release operations. When a hand wheel is rotated clockwise, such rotation is transmitted directly through a drive shaft, a pinion, a gear, and a winding drum to take up slack of a chain connected to the brake rigging. When resistance is offered by the chain to further rotation of the hand wheel, such resistance, acting back through the drum, the gear, and pinion, causes a nut to be advanced on a threaded portion of the drive shaft to move against a ratchet member which is clamped between respective friction surfaces on the nut and on the drive shaft, thus causing the drive shaft, ratchet, and the nut to rotate as a unit. A pawl prevents rotation of the ratchet in the opposite direction. The hand wheel torque is increased until a state of static equilibrium is reached, or at the point at which the brakes are fully applied, whereupon rotation of the hand wheel is terminated, and the clamped ratchet, by means of the holding pawl, prevents the chain from unwinding.

To effect gradual release of the brakes, the hand wheel is rotated in a counterclockwise direction which at first partially loosens the nut, thus reducing clamping force on the ratchet which is prevented from rotating by the holding pawl. This action also allows the pinion and gear to rotate and thereby reduce chain load. Continued counterclockwise rotation of the hand wheel effects complete release of the chain load and the brakes.

The clutch mechanism also provides for quick release of the brakes by operating a release handle which effects disengagement of the normally engaged clutch and thereby allows free rotation of the pinion and gear to release chain load while the nut and ratchet are held stationary by the holding pawl.

OPERATION AND DESCRIPTION

Figure 1:
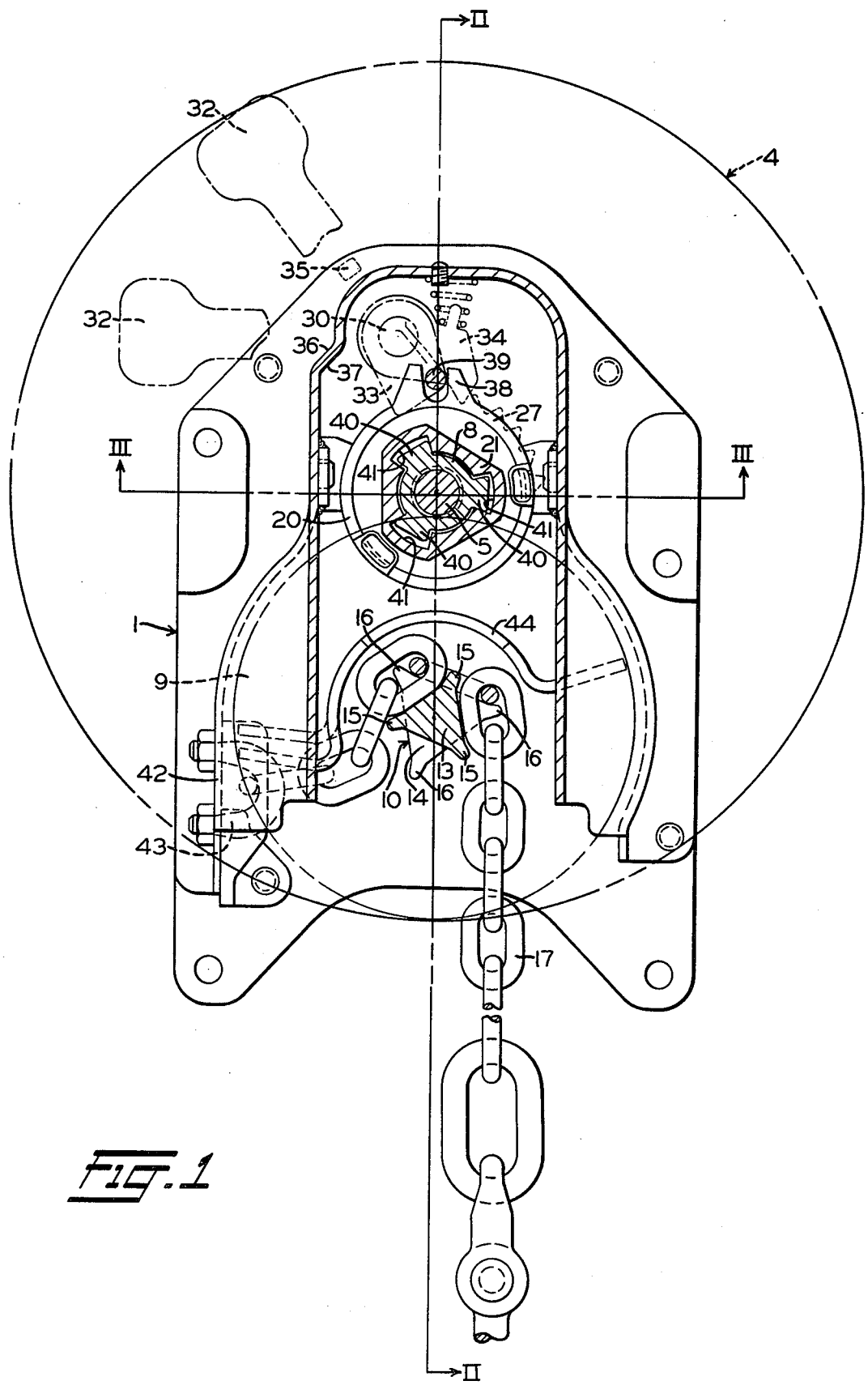
FIG. 1 is an elevational frontal view, partly in section, of a hand brake device embodying the invention.
Figure 2:
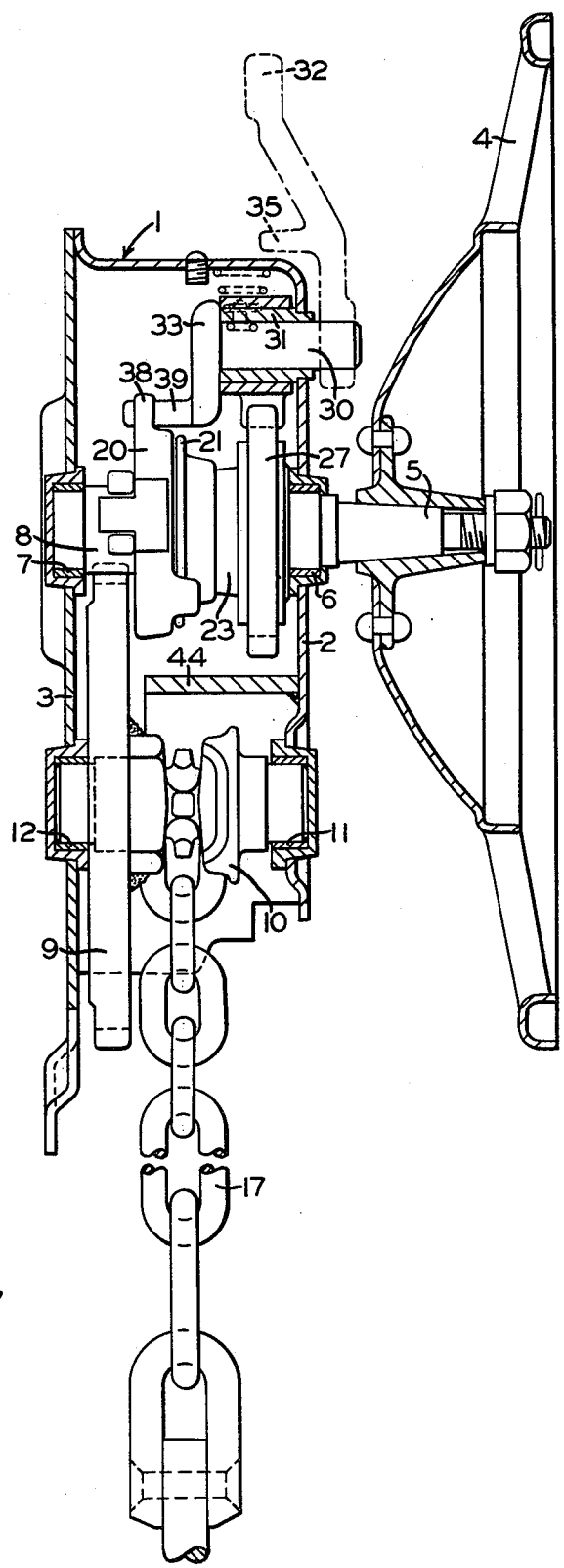
FIG. 2 is an elevation view, in section, taken along line II—II of FIG. 1 as viewed in the direction indicated by the arrows.
Figure 3:
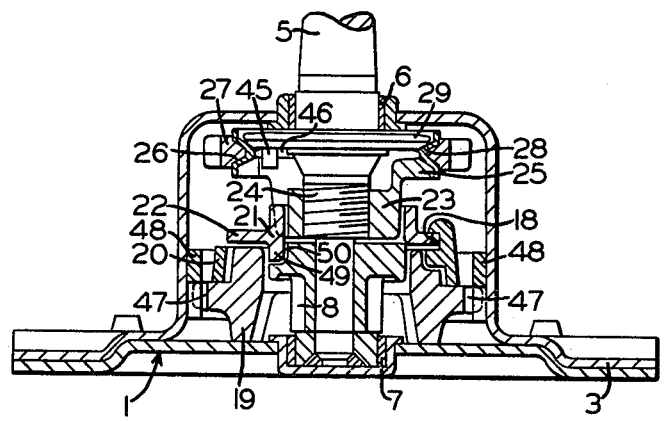
FIG. 3 is a sectional view taken along line III—III of FIG. 1 as viewed in the direction indicated by the arrows.

A hand brake for railroad cars embodying the invention, as shown in FIGS. 1, 2, and 3, comprises a housing 1 having a front plate 2 and a back plate 3 (see FIG. 2). A driving mechanism is disposed in the upper portion of housing 1, as viewed in FIGS. 1 and 2, said driving mechanism comprising a hand wheel 4 secured to a drive shaft 5, said drive shaft being journaled for rotation in bearings 6 and 7 secured in front plate 2 and back plate 3, respectively.

Figure 9:
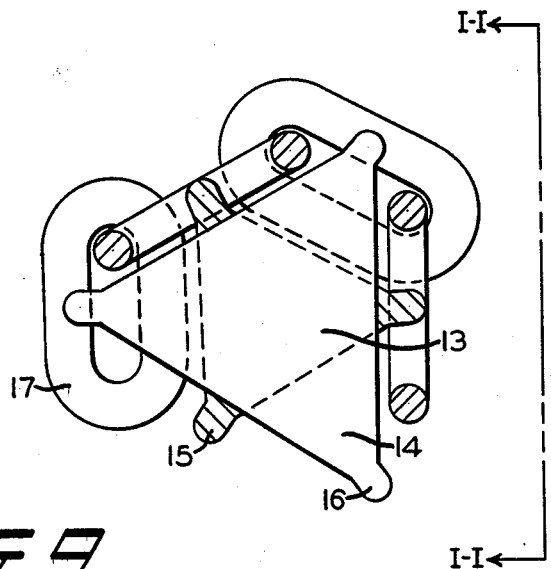
FIG. 9 is a vertical elevational view of the chain drum element.
Figure 10:
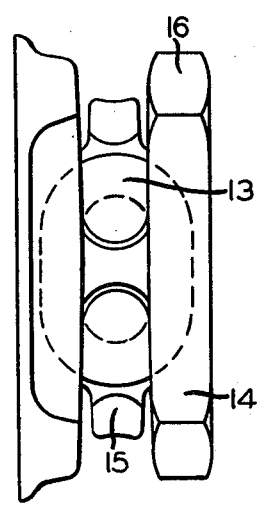
FIG. 10 is a horizontal sectional view taken along line I—I of FIG. 9 as viewed in the direction indicated by the arrows.

As best seen in FIGS. 2 and 3, drive shaft 5 has secured thereon for rotation therewith, at the end adjacent bearing 7, a pinion 8 which meshes with a gear 9 for rotating a chain drum 10 journaled for rotation in bearings 11 and 12 secured on front plate 2 and back plate 3, respectively, in the lower portion of housing 1 (see FIGS. 1 and 2). Chain drum 10 is provided with a central sprocket or cog wheel 13 axially centered on said drum and two lateral sprocket or cog wheels 14 (see FIGS. 9 and 10) axially spaced on said drum on opposite sides of sprocket wheel 13. Each of sprocket wheels 13 and 14 is provided with three equiangularly spaced cogs or teeth 15 and 16, respectively, the cogs 16 of sprocket wheels 14 being angularly offset 60° relative to cogs 15 of sprocket wheel 13. Cogs 15 of central sprocket wheel 13 engage alternate links of a chain 17 for either taking-up or letting-out said chain, whereas cogs 16 of the lateral sprocket wheels 14 guide said chain links in proper alignment with the central cogs 15, thereby assuring smooth continuity of movement of said chain over drum 10.

Figure 4:
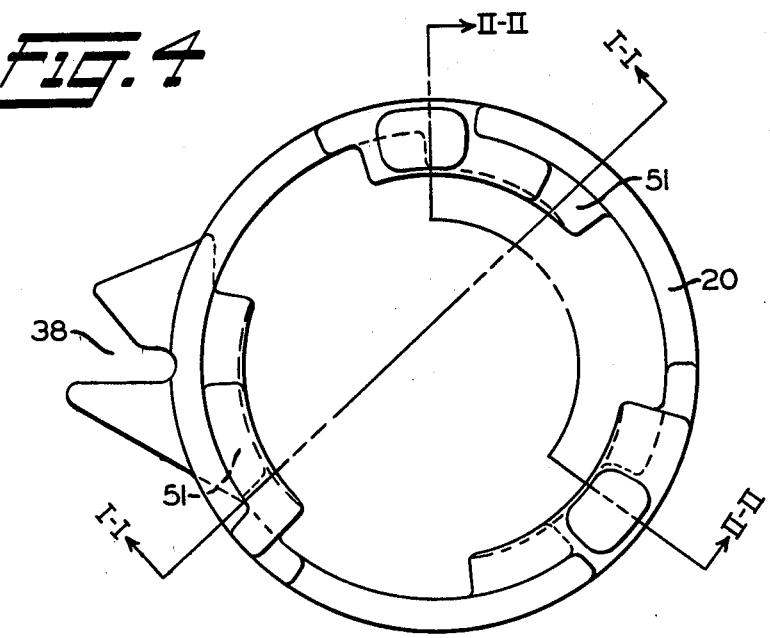
FIG. 4 is a vertical elevational view of the movable cam element.
Figure 5:
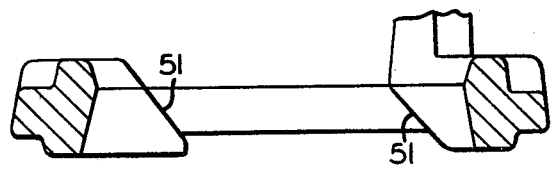
FIG. 5 is a horizontal sectional view taken along line I—I of FIG. 4 as viewed in the direction indicated by the arrows.
Figure 6:
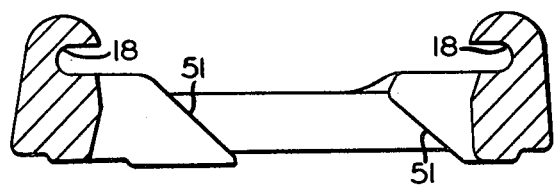
FIG. 6 is a horizontal sectional view taken along line II—II of FIG. 4 as viewed in the direction indicated by the arrows.
Figure 7:
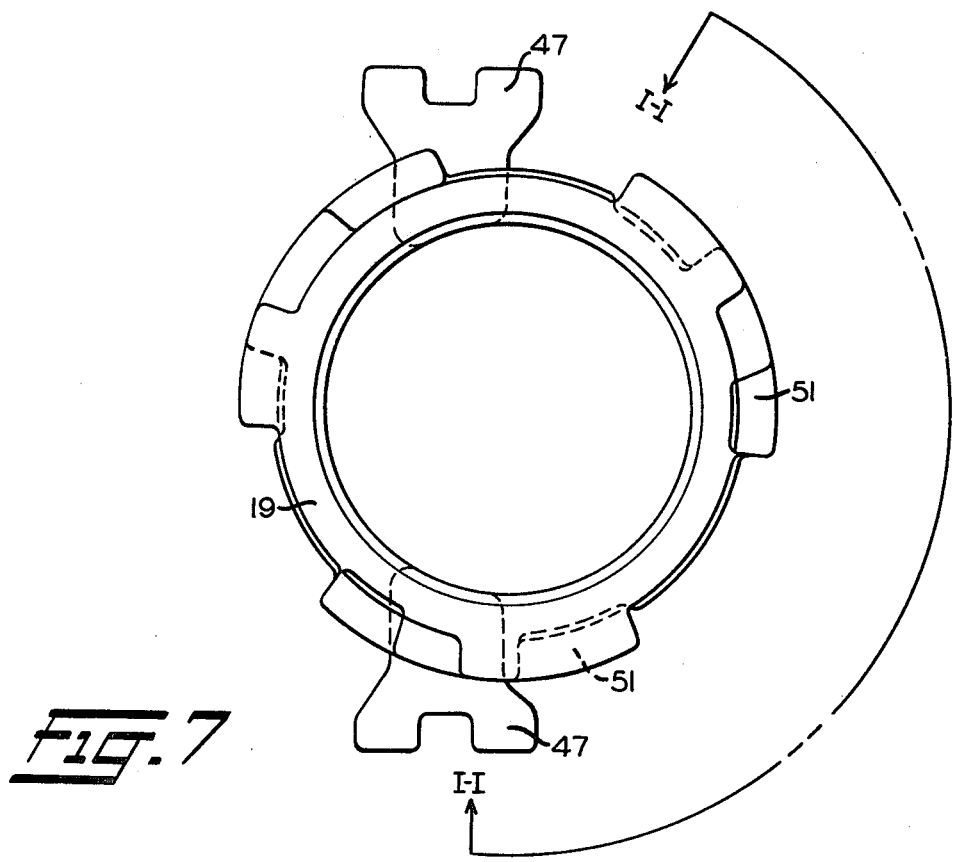
FIG. 7 is a vertical elevational view of the stationary cam element.
Figure 8:
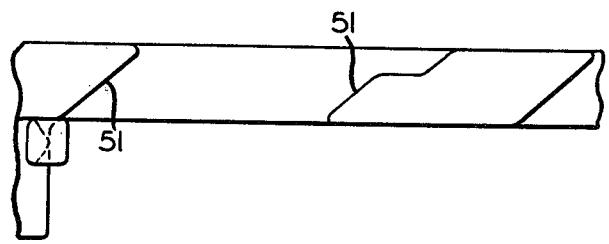
FIG. 8 is a horizontal sectional view taken along line I—I in FIG. 7 as viewed in the direction indicated by the arrows.

Also disposed in the upper portion of housing 1 and associated with the driving mechanism, is a clutch and quick release mechanism 18 which may best be seen in FIG. 3. The clutch and quick release mechanism 18 comprises an annular stationary cam member 19 (see FIGS. 7 and 8), restrained from both axial and rotational movement, and a movable cam member 20 (see FIGS. 4, 5 and 6) rotatably disposed concentrically within said stationary cam, said movable cam being rotatable relative to the stationary cam member by means of complementary fast pitch threads 51 (see FIGS. 5 and 6) formed thereon.

An internally splined annular clutch collar 21 is provided with an annular flange 22 and concentrically surrounds drive shaft 5, said collar engaging with an externally splined nut 23 screwable on a screw-threaded portion 24 of said shaft. Nut 23 has a flange 25 with an annular friction surface 26 for making abutting contact with one side of a ratchet wheel 27, the other side of said ratchet wheel being abuttable with a friction surface 28 of a friction plate 29 concentrically secured to shaft 5 adjacent bearing 6.

A release shaft 30 is journaled in a release shaft bushing 31 perpendicularly secured in housing front plate 2 above the driving mechanism, as viewed in FIG. 2. A release handle 32 is secured to an external end of release shaft 30 while the other end of said release shaft is provided with a release shaft flange 33, thereby preventing axial displacement of the shaft. A holding pawl 34 is rotatably mounted on release shaft bushing 31 and engages ratchet wheel 27 and is free to ratchet thereon upon rotation in a clockwise direction, as viewed in FIG. 1, of the ratchet wheel. A release handle lug 35 fixed on release handle 32 (see FIG. 2) and a housing side wall 36 limit counterclockwise rotation of release handle 32, while release shaft flange 33 and a housing side wall 37 limit clockwise rotation of release shaft 30 to insure positive linkage between said shaft and a movable cam fork 38 through a pin 39 formed on said shaft and engageable with said fork (see FIGS. 1 and 4).

In operation, in order to apply the brakes, hand wheel 4 is rotated clockwise, such rotation being transmitted through drive shaft 5, and pinion 8 to cause rotation of gear 9 in a counterclockwise rotation and thereby take-up slack of chain 17. Until such time that tension starts to build up in chain 17, shaft 5, pinion 8, nut 23, and clutch collar 21 all rotate as a unit durfing rotation of hand wheel 4. When tension begins to build up in chain 17, such tension is reflected in gear 9 and transmitted back through pinion 8 to clutch collar 21, which is drivingly coupled by a plurality of lugs 40 registering with complementary recesses 41 formed in said clutch collar (see FIG. 1). Resistance to rotation by clutch collar 21, which is splined to nut 23, causes said nut to advance on threads 24 and thereby clamp ratchet member 27 between friction surfaces 26 and 28. With ratchet 27 so clamped, continued rotation of wheel 4 causes drive shaft 5, the ratchet member, and nuts 23 (along with friction plates 29) to rotate as a single unit until the desired tension is attained on chain 17, while holding pawl 34 ratchets on said ratchet member. When desired tension has been achieved on chain 17, rotation or application of torque on wheel 4 is terminated, and the holding pawl engaged on clamped ratchet member 27 prevents the chain from unwinding, since said pawl permits only clockwise rotation of said ratchet member.

Chain 17 is connected at one end to brake rigging (not shown) of a railroad car (not shown), while the other end is anchored to a side wall 42 of casing 1 by a U-bolt 43 (see FIG. 1). A generally semicircular chain guide 44 is welded to front plate 2 and is disposed in coaxial relation to chain drum 10 for guiding and containing chain 17 within certain limits during take-up or let-out, as will later be explained.

Once applied, the brakes may be released either gradually or quickly.

For effecting a gradual release of the brakes, hand wheel 4 is turned counterclockwise slightly to partially loosen nut 23 and thereby reduce the clamping force on ratchet member 27, which is restrained from rotation by holding pawl 34. The initial counterclockwise rotation of hand wheel 4 effects a corresponding rotation of pinion 8 and gear 9, thereby easing tension on chain 17. Continued counterclockwise rotation of hand wheel 4 effects complete release of the load on chain 17 with gear 9 continuing to rotate until winding drum 10 has taken up all chain slack between said winding drum and U-bolt 43, that is, the amount of chain that had been taken up during the brake-applying phase of operation. When all chain slack has been taken up, further rotation of gear 9, pinion 8 and nut 23 is terminated with the brakes fully released. Counterclockwise rotation of hand wheel 4 is limited by a drive shaft pin 45 which projects into a slot 46 formed in nut 23.

A quick release of the brake application is effected by rotating release handle 32 (which is normally in an applied position) in a clockwise direction, as viewed in FIG. 1, to a release position which, by engagement of pin 39 with fork 38 of movable cam 20, causes counterclockwise rotation of said movable cam. As was hereinbefore noted, stationary cam 19 and movable cam 20 are provided with complementary fast-pitch threads, so that as movable cam 20 rotates counterclockwise, it moves axially outwardly of said stationary cam, in an upwardly direction as viewed in FIG. 3, and carries with it clutch collar 21 by engagement of flange 22 thereof. A groove 18 in movable cam 20 serves to constrain the collar flange 22 from relative axial and lateral movement with respect to movable cam 20 but allows free clutch collar 21 rotation. Stationary cam 19 is restrained against both rotational and axial movement by engagement of lugs 47 formed on the periphery thereof and engaged in respective T-shaped elements 48 fixed to the inside surface of casing 1 (see FIG. 3). Thus, upward axial movement of movable cam 20 causes axial disengagement of external splines 49 formed on clutch collar 21 from internal splines 50 formed on pinion 8, thereby allowing pinion 8 and gear 9 to rotate freely for releasing the load on chain 17, while drive shaft 5, nut 23, collar 21, and ratchet 27 are all held stationary by holding pawl 34.

When the brakes are fully released, the operator allows release handle 32 to return by gravity to the "applied" position from which the brakes may again be applied if desired. As the release handle 32 rotates counterclockwise to its "applied" position, release shaft 30 also rotates counterclockwise to cause movable cam 20 to be screwed into stationary cam 19, thereby restoring splines 49 of clutch collar 21 into engagement with splines 50 of pinion 8.

During quick release operation, when pinion 8 and gear 9 are rotating freely to release the tension on chain 17, the tensional energy stored in said chain is absorbed and dissipated by the chain guide 44 and U-bolt 43, thus eliminating the necessity of an external cushioning device for absorbing such energy.

Having thus described the invention, what we claim as new and desire to secure by Letters Patent, is:

1. A handbrake, including a chain connectable at one end to a railroad car brake, said brake comprising:
  (a) a chain drum by which said chain may be either taken up for effecting a brake application when rotated in one direction or let out for releasing the brake application when rotated in an opposite direction;

(b) manually operable driving means connected to said chain drum and rotatable in one direction or an opposite direction for causing rotation of said chain drum into said one or said opposite direction, respectively, said driving means including a drive shaft having a screw-threaded portion and a pinion secured at the opposite end of said drive shaft for rotation therewith; and (c) a clutch and release mechanism cooperatively connected with said driving mechanism and operable upon rotation thereof in said one direction and upon buildup of tension on said chain during take-up thereof for effecting a brake application, to an engaged disposition in which said driving means is constrained from rotation in said opposite direction and thereby maintaining the brake application until released;

(d) said clutch and release mechanism including ratchet means rotatable along with the driving means and cooperative with a holding pawl, upon termination of manual effort on the driving means for retaining said driving means and the brake application in a state of equilibrium, said clutch and release mechanism further including a clutch collar rotatably engaged with said pinion, an annular stationary cam member secured in fixed coaxial surrounding relation to said drive shaft adjacent to the end to which said pinion is secured, an annular movable cam disposed coaxially with and in surrounding relation to said stationary cam and being connected therewith by complementary fast pitch threads formed partly on said stationary cam and partly on said movable cam, a release lever connected to said movable cam and effective, upon rotation in one direction, for rotating said movable cam and effecting axial movement thereof via said fast pitch threads, said clutch collar having a flange formed thereon engageable by said movable cam during axial movement of the latter for operating said clutch collar to a disengaged position from said pinion, so that said pinion is disconnected from the driving mechanism and may rotate freely to effect a quick release of the brakes.

2. A hand brake, as set forth in claim 1, wherein said manually operable driving means comprises:
(a) a hand wheel;
(b) a drive shaft secured at one end to said hand wheel and rotatable therewith;
(c) a pinion secured at the opposite end of said drive shaft for rotation therewith; and
(d) a gear coaxially secured to said chain drum and meshing with said pinion for transmitting rotation of the hand wheel to the chain drum through the drive shaft, the pinion, and the gear.

3. A hand brake, as set forth in claim 1, wherein said chain drum is provided with a plurality of sprocket wheels coaxially secured thereto for rotation therewith, said sprocket wheels comprising a central sprocket wheel axially centrally disposed on the drum for engaging alternate links of said chain for effecting take-up or let-out thereof, and a pair of lateral sprocket wheels disposed in axially spaced relation to said central sprocket wheel on opposite sides thereof for guiding said chain into engagement with said central sprocket wheel.

4. A hand brake, as set forth in claim 3, wherein each of said sprocket wheels is provided with a plurality of equiangularly spaced cogs with the cogs of the lateral sprocket wheels being angularly offset relative to those of the central sprocket wheel.

5. A hand brake, as set forth in claim 4, wherein each of said sprocket wheels is provided with three cogs with the cogs of said lateral sprocket wheels being offset 60° relative to those of the central sprocket wheel.

6. A hand brake, as set forth in claim 2, wherein said drive shaft is provided with a screw-threaded portion, and said clutch and release mechanism comprises:

(a) a clutch collar rotatably engaged with said pinion,
(b) a nut screw-threadedly disposed on said screw-threaded portion of said drive shaft and rotatably engaged with said clutch collar; and
(c) friction plates carried by said drive shaft in axially spaced-apart relation to said nut,
(d) said pinion, clutch collar, nut, and friction plates all being rotatable as a unit during free take-up of the chain during brake-applying operation, and
(e) said gear, pinion, clutch collar, and nut being constrained from free rotation, upon build-up of tension in the chain transmitted back through the gear and pinion, and causing said nut to be moved on said screw-threaded portion to an advanced position in which a flange formed on the nut is brought into abutting contact with and effectively clamps said ratchet means between the nut flange and said friction plates to restrain further rotation of the ratchet member.

* * * * *